Nov. 27, 1956    J. UNTERREINER    2,772,384
SPEED CONTROL FOR A-C. MOTORS
Filed Dec. 28, 1950    2 Sheets-Sheet 2

INVENTOR
JOSEF UNTERREINER

United States Patent Office 2,772,384
Patented Nov. 27, 1956

2,772,384

SPEED CONTROL FOR A. C. MOTORS

Josef Unterreiner, Zurich, Switzerland, assignor to Alois Huwyler, Zurich, Switzerland Application December 28, 1950, Serial No. 203,177

Claims priority, application Switzerland November 14, 1950

4 Claims. (Cl. 318—229)

The present invention relates to an appliance for the infinitely variable speed adjustment of single and polyphase motors.

It is one of the primary objects of the invention to provide means facilitating inexpensive manufacture of speed control means of the aforesaid type, which is very simple, effective and sturdy in construction, takes up very little space, is extremely sensitive in operation and ensures at any time positive transfer of centrifugal force to movement-responsive means.

It is another object of the invention to provide means ensuring equally high sensitivity of the speed control means in either direction of rotation and the disposition of the principal parts of said control means in a manner that they remain axially aligned and normally always in contact with each other.

Still another object of the invention resides in the provision of means affording substantially stepwise action of the speed control means at first in lower and subsequently in higher speed ranges and in accordance with load variations.

Yet a further object of the invention is to provide means enabling ready change or pre-adjustment of centrifugally actuated means of governor or control mechanisms to thereby conform the same to various practical requirements and to enhance usefulness of such mechanisms within wide speed ranges.

The above and other objects and features will become apparent from the following detailed description, reference being had to the accompanying drawings.

Figure 1:
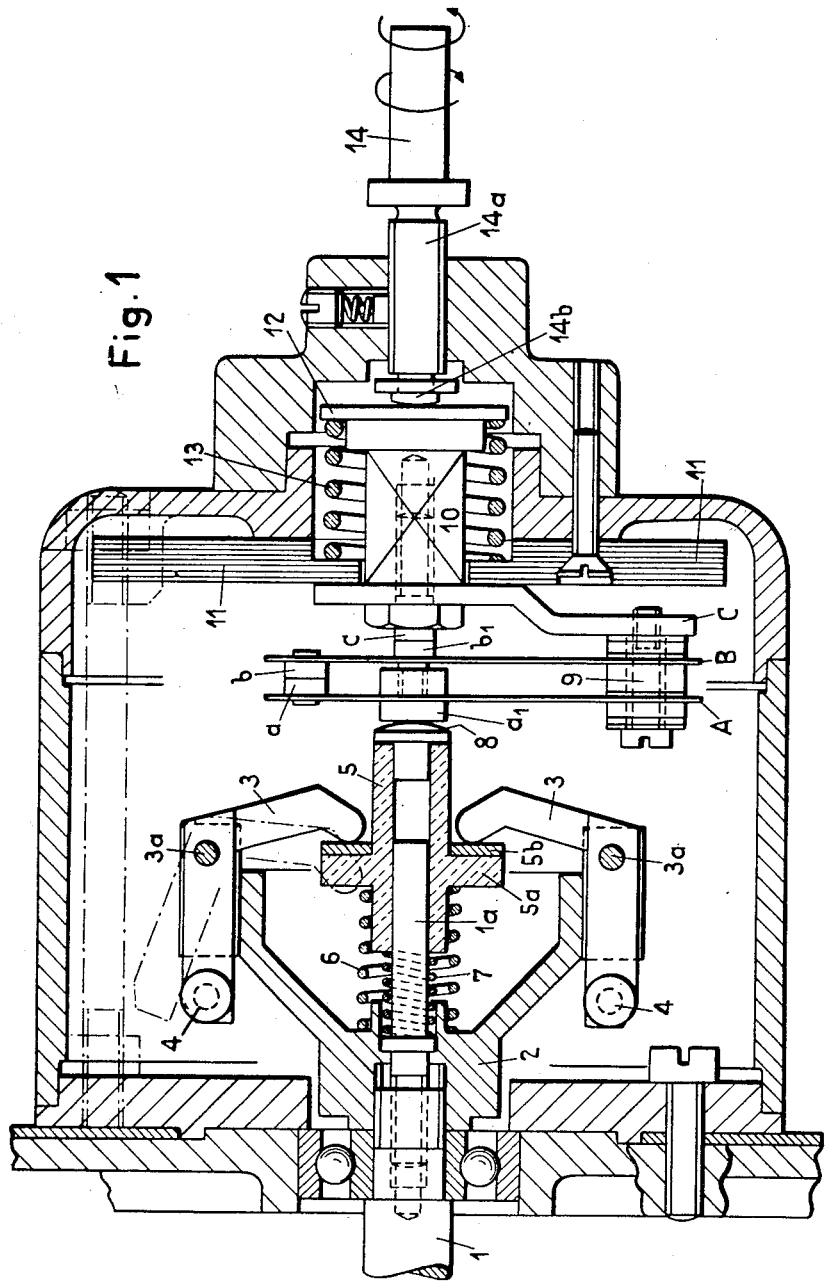
Fig. 1 is a longitudinal sectional view of a governor mechanism made in accordance with the invention.

With reference to the embodiment illustrated in Fig. 1, the shaft 1 of a motor 27 (Fig. 2) that has to be regulated in accordance with the invention is rigidly connected to the rotor 2 of a governor member in the form of a centrifugal governor. In bearings 3a of the rotor 2, two flyweight arms 3 are swivelly supported and provided with interchangeable and alterable weights 4. On the extension 1a of the shaft 1, provision is made for an axially displaceable pusher 5 of insulating material, having a collar 5a with metal disc 5b projecting to within reach of the flyweight arms 3. Arranged between the collar 5a and the rotor 2 is a coil spring 6, within which another smaller coil spring 7 is accommodated. By this spring combination 6, 7, the pusher 5 with its end 8 consisting of a steel rivet, is biased in the direction of the contact device $a_1$, $a$, $b$, $b_1$ and $c$. The insulating sleeve 5 bears on the flyweight arms, which in operation act to displace the pusher 5 in the direction against the actions of springs 6, 7.

The contact device includes a structural unit which carries the actual contact pieces $a$, $b$, $b_1$ and $c$. The contact pieces $a$ and $b$ are mounted on spring tongues or bars which have connections A and B and sit on an insulating block 9, through which they are firmly arranged on the carrier of the connection C and of the contact $c$. The carrier of the connection C in turn is fixed on an insulating block 10 movably guided axially and non-rotatably with respect to the motor shaft 1, 1a and a regulating member 14. The insulating block 10 is square in cross-section and passes through a corresponding square hole in a wall plate 11 of the governor casing. Between the insulating wall 11 and a shoulder 12 of the insulating block 10, a coil spring 13 is inserted by which the structural unit of the contact device is pressed against the end 14b of a screw 14a, on whose free end an arbitrarily adjustable regulating member in the form of a handle 14 is arranged. The contact device $a_1$, $a$, $b$, $b_1$ is so designed and arranged that the contacts are in the open state when not subjected to any external action. Instead of a screw-threaded regulating handle 14, 14a, 14b, a slide for foot operation may, for instance, be provided.

Figure 2:
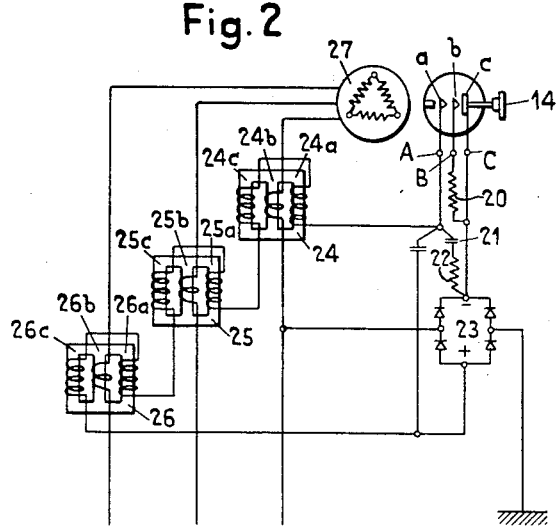
Fig. 2 shows schematically a wiring diagram for the regulation of the three-phase motor.

According to the diagram of Fig. 2, the connections A, B, C of the described contact device are shifted as follows:

The connection A of the contact $a$ is preferably connected on the one hand through a spark-extinguishing device having a capacitance 21 and an impedance 22, with the negative pole of the disc-type rectifier 23, and on the other hand with the conductor of the outer core coils or saturating windings, 24a, 24c, 25a, 25c, and 26a, 26c, all arranged in series and whose end conductor is connected to the positive pole of the disc-type rectifier 23. The aforesaid cores form part of saturable reactors 24, 25 and 26, whose intermediate cores 24b, 25b and 26b are surrounded by load windings which carry the phase currents R, S, T of the three-phase motor to be regulated.

Said saturating windings of said saturable reactors 24, 25 and 26 are so arranged in relation to the load windings, that the induction voltage produced by the latter in the saturating windings is compensated. It should also be mentioned that the cross-section of the intermediate core of each reactor is double that of one of the two related outer cores.

The second contact $b$ or its connection B is connected through a series resistance 20 direct to the contact $c$ or its connection C, which in turn is directly connected to the negative pole of the rectifier 23. The dry rectifier 23 is for its part connected on the one hand to a conductor, say T, of the motor-current circuit, and on the other hand to the ground. According to the aforedescribed wiring diagram, the regulating current in the motor circuit consists of a separate direct current produced by the rectifier 23.

The mode of action of the aforedescribed appliance for adjusting the speed of three-phase motors is as follows:

In order to increase the speed, the regulating handle 14 is turned clockwise, thus causing a displacement of the contact device as a whole until the head $a_1$ abuts against the end of the pusher or insulating sleeve 5, so that the contacts $a$—$b$ and $b_1$—$c$ are closed. The head 8 of the pusher 5 acts as a stop, since the pressure of the springs 6, 7 is greater than the pressure of the spring contacts $a$ and $b$. Upon closing of these contacts, the regulating currnet, i. e., the exciter direct current (of say 220 volts) for the saturable reactors 24, 25 and 26 of the motor 27 is switched on through the series resistance 20, whereby the two outer cores of each reactor are excited. Thus the magnetic flux of the related intermediate cores 24b, 25b and 26b is influenced so that the inductive reactance of each load winding diminishes. The ohmic resistance of the latter is so slight that the voltage drop is less than 5 percent. Their impedances may be provided in such a way that, if there is no direct current excitation of the related outer cores, the motor 27 rotates only at a low speed. In consequence of the voltage increase at the motor through the described operation of the regulating handle 14, the motor begins to rotate quicker. Upon further turning the handle, also the contact $b_1$—$c$ closes, and thus the series resistance 20 is short circuited, thereby causing a further increase in voltage. Hence the speed of the motor 27 increases again to the desired value, without any oscillating phenomena occurring in the course of this regulating operation, and without the motor current being interrupted.

In order to reduce the speed of the motor, the regulating handle 14 is turned counterclockwise. Under the influence of spring 13 the contact device is thus displaced in the direction of the regulating handle, whereby the contacts $b_1$—$c$ are opened, while the contacts $a$—$b$ are still closed. Thereupon the series resistance 20 is once again switched-in, so that a voltage drop occurs in the regulating current circuit, whereby the reactance of the load windings of the saturable reactors increases and the speed of the motor consequently drops. Upon further retraction of handle 14 in a counterclockwise direction, the contacts $a$—$b$ open, so that the excitation of the outer cores of the reactors is interrupted. The reactance of the load windings of the respective reactors then rises to a maximum, thereby causing the voltage at the terminals of the motor 27 to fall to a minimum.

The centrifugal governor assembly 2, 3 and 4 has for its function the prevention of too rapid alterations in speed, especially when fluctuations in load occur. Along with the pusher or insulating sleeve 5, the governor assembly determines the spacing of contacts $a$—$b$; $b_1$—$c$, said contacts, upon closing, giving rise to the regulating exciter impulses with the air of the spark-extinguishing device.

Should the motor speed increase quickly, the weights 4 fly radially outwardly, whereupon the arms 3 act on the insulating sleeve 5 against the force of the coil springs 6 and 7, so that the sleeve 5 is displaced and the contacts $a$—$b$ and $b_1$—$c$ opened. Consequently the regulating current is interrupted and thereupon the excitation of the reactors 24, 25 and 26 ceases, while the reactance of the related load windings 24b, 25b and 26b rises to maximum value. Consequently the voltage at the terminals drops, and accordingly the speed of the motor 27 is reduced.

The reverse effect occurs with increasing load on the motor 27. In the latter case, as a result of the reduction in speed, the governor weights 4 fly radially inwardly, the pressure on the pusher or insulating sleeve 5 diminishes, and the springs 6 and 7 displace the insulating sleeve 5 so that the contacts $a$—$b$ and $a_1$—$c$ close and the saturating windings on the outer cores of the saturable reactors 24, 25 and 26 get the full voltage. If the motor stops without the regulating handle 14 being screwed back, the head 8 of the insulating sleeve 5 presses on $a_1$, $b_1$ and keeps the contacts $a$—$b$ and $b_1$—$c$ closed. When the motor is switched on again, its speed will increase until the contacts are opened corresponding to the degree of loading.

Figure 3:
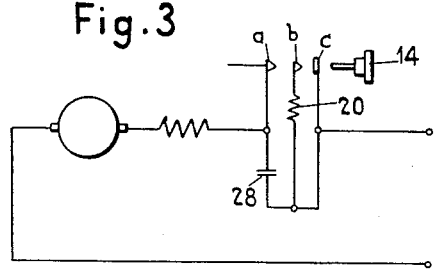
Fig. 3 shows the arrangement for a single-phase series motor.

Referring now to Fig. 3, in the case of smaller series motors connected, for example, to lighting mains, the connections A and C of the contacts $a$, $c$ are connected directly to the motor current conductors, while the connection B of the contact $b$ is connected on the one hand through a resistance 20 to the contact $c$ and to one of the current conductors, and on the other hand through the resistance 20 and a condenser 28 to the contact $a$ and to the other motor current conductor. In this case the condenser 28 forms the requisite spark-extinguishing device, while the resistance 20 acts instead of the choke-coils as damping member.

An important feature of the control means of the present invention resides in the particular arrangement and interrelationship of springs 6 and 7 and their cooperation with axially displaceable sleeve means 5 in such a manner that the sensitivity and range of usefulness of the device is significantly enhanced for operation in both low and high speed ranges and responsive to relatively large load fluctuations. This adaptability of the above described device is principally achieved by providing a relatively weak spring 7 and a relatively strong spring 6 for selectively and automatically controlling the displacement of sleeve means 5 responsive to the action of centrifugally actuated arms or levers 3 at both low and high speed ranges of motor shaft 1. Relatively weak spring 7 will thus be operative in a low speed range below a predetermined critical limit and relatively strong spring 6 will be automatically operative in a higher speed range above said critical limit, which critical limit may, of course, be varied by predetermining the relative spring tensions of springs 6 and 7.

Figure 4:
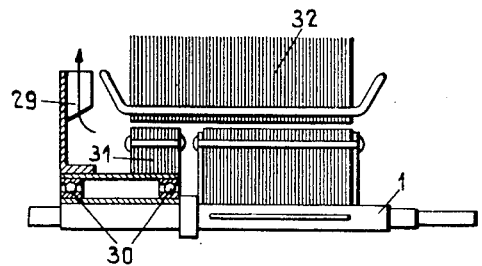
Fig. 4 represents the fitting of a special fan in the casing of one of the motors provided with the regulating device.

According to the example illustrated in Fig. 4, a fan 29, independent of the speed of the motor shaft, is provided in the motor to be governed, the fan being located in the motor housing. The fan 29 is rotatably mounted on the motor shaft 1 by means of ball bearings 30, and it has a rotor 31 lying in the field of the motor stator 32.

By arranging such a fan independently of the motor speed, it is possible to employ a motor one or two sizes smaller and having the same output as a normally ventilated motor, since the regulated voltage acting on the motor influences the fan in such a way that its ventilating effect, or its speed, automatically adjusts itself to the state of loading of the motor.

By the practice of the present invention a device is provided which ensures a linear relationship between motor speed and degree of loading with both increasing as well as decreasing loading.

I claim:

1. Means for infinitely variable speed adjustment of a three-phase motor having a drive shaft; comprising, in combination, an electrical contact device having contact elements engageable with one another, a displaceable member located on one side of said contact device and responsive to variations in the speed of said shaft, a manually adjustable regulating member located on the opposite side of said contact device, said displaceable member and said regulating member being abuttable against said contact device and controlling the spacing of said contact elements for opening and closing the latter, a main three-phase power supply circuit for said motor, saturable reactor means including a plurality of load windings connected in each of the respective phases of said three-phase circuit and saturating windings for controlling the saturation of said reactor means and thereby controlling the inductive reactance of said load windings, a source of control voltage, and means connecting said contact elements in series with said saturating windings across said source of control voltage, whereby said contact elements control the saturation of said reactor means and thus the speed of the motor.

2. Means for continuously regulating the number of revolutions per minute of an electrical three-phase motor having a drive shaft; comprising, in combination, a contact device including pairs of contact means arranged to form first and second switch means placed in series with each other, regulator means responsive to changes in the number of revolutions of said shaft, a manually actuatable element operable to preadjust both said switch means, said regulator means and said element being arranged independently of each other and being operatively engageable with said contact means, respectively, in such manner, that upon increase of said number of revolutions beyond that corresponding to the degree of adjustment of both said switch means by said element said first switch means is opened, while subsequently upon further increase of said number of revolutions of said shaft said second switch means is opened, a main three-phase power supply circuit for said motor, saturable iron core reactor means including a plurality of load windings connected in each of the respective phases of said three-phase circuit and saturating windings controlling the saturation of said reactor means and thereby controlling the inductive reactance of said load windings, a source of control voltage, means connecting both said switch means in series with said saturation windings and across said source of control voltage, and electric resistance means operatively connected across said contact means of said first switch means, whereby upon opening of said first switch means said resistance means is connected in series with said saturating windings to thereby enable both said switch means to control the saturation of said reactor means and thus the speed of the motor.

3. Regulating means according to claim 2, including an electric condenser and further resistance means connected in series with each other, said condenser and further resistance means being connected across said contact means of both said switch means.

4. Regulating means according to claim 3, said series-connected condenser and further resistance means being additionally connected in series with said first-named resistance means and across said second switch means, whereby upon closing of said first switch means said condenser and both said resistance means are short circuited.

References Cited in the file of this patent

UNITED STATES PATENTS

| | | |
|---|---|---|
| 953,219 | Muller | Mar. 29, 1910 |
| 1,767,146 | Lee | June 24, 1930 |
| 1,954,884 | Mears | Apr. 17, 1934 |
| 1,979,890 | Lee | Nov. 6, 1934 |
| 2,102,911 | Perry | Dec. 21, 1937 |
| 2,281,711 | Peck | May 5, 1942 |
| 2,353,314 | Lee | July 11, 1944 |
| 2,462,751 | Koehler | Feb. 22, 1949 |
| 2,493,140 | Heath | Jan. 3, 1950 |
| 2,500,190 | Lee | Mar. 14, 1950 |

FOREIGN PATENTS

| | | |
|---|---|---|
| 123,947 | Australia | Apr. 1, 1947 |
| 361,107 | Great Britain | Nov. 19, 1931 |